(12) United States Patent
Crocker et al.

(10) Patent No.: US 7,296,237 B2
(45) Date of Patent: Nov. 13, 2007

(54) DATA REPLICATION SYSTEM AND METHOD

(75) Inventors: Stephen Crocker, Bethesda, MD (US); Jeffrey Kay, Springfield, VA (US)

(73) Assignee: Shinkuro, Inc., Bethesda, MD (US)

( * ) Notice: Subject to any disclaimer, the term of this patent is extended or adjusted under 35 U.S.C. 154(b) by 1078 days.

(21) Appl. No.: 10/390,377

(22) Filed: Mar. 17, 2003

(65) Prior Publication Data

US 2003/0177194 A1 Sep. 18, 2003

Related U.S. Application Data

(60) Provisional application No. 60/443,239, filed on Jan. 28, 2003, provisional application No. 60/382,659, filed on May 22, 2002, provisional application No. 60/364,648, filed on Mar. 15, 2002.

(51) Int. Cl.
G06F 15/00 (2006.01)
G06F 13/00 (2006.01)

(52) U.S. Cl. .................................. 715/750; 705/739

(58) Field of Classification Search ........ 715/750–751, 715/752, 739, 742, 736; 709/206–207
See application file for complete search history.

(56) References Cited

U.S. PATENT DOCUMENTS

| | | | |
|---|---|---|---|
| 5,781,908 A | 7/1998 | Williams et al. | |
| 5,809,251 A | 9/1998 | May et al. | |
| 5,862,346 A | 1/1999 | Kley et al. | |
| 5,903,897 A | 5/1999 | Carrier, III et al. | |
| 5,956,402 A | 9/1999 | Vo | |
| 6,018,747 A | 1/2000 | Burns et al. | |
| 6,161,137 A | 12/2000 | Ogdon et al. | |
| 6,161,146 A | 12/2000 | Kley et al. | |
| 6,175,920 B1 | 1/2001 | Schanze | |
| 6,182,117 B1 | 1/2001 | Christie et al. | |
| 6,195,432 B1 | 2/2001 | Takahashi et al. | |
| 6,202,207 B1 | 3/2001 | Donohue | |
| 6,233,600 B1 | 5/2001 | Salas et al. | |
| 6,289,382 B1 | 9/2001 | Bowman-Amuah | |
| 6,308,201 B1 | 10/2001 | Pivowar et al. | |
| 6,332,163 B1 | 12/2001 | Bowman-Amuah | |
| 6,339,832 B1 | 1/2002 | Bowman-Amuah | |

(Continued)

FOREIGN PATENT DOCUMENTS

WO   WO 01/16804 A2   8/2001

*Primary Examiner*—Cao (Kevin) Nguyen
(74) *Attorney, Agent, or Firm*—Roberts, Mardula & Wertheim, LLC (57) ABSTRACT

A data replication system and method. The method and apparatus provides for an efficient means of replicating data over a network in the form of a file between two individuals, or within defined groups of individuals, using a variety of devices to access the Internet, including computers, personal data assistants ("PDA"s) and wireless devices. A group is formed through an exchange of invitation, acceptance, and welcome messages. A group member designates a replication directory on the group member's computer. Files placed in the directory are replicated and stored in the replication directory of each of the other members of the group. Any change to a replicated file causes a message by one member to be sent to all other members. Changes are conveyed via patches that represent the changes made to a replicated file. Replicated files are saved without replacing previous versions of the replicated file. The group formation and file replication processes are accomplished using existing network protocols.

20 Claims, 4 Drawing Sheets

U.S. PATENT DOCUMENTS

| | | |
|---|---|---|
| 6,401,239 B1 | 6/2002 | Miron |
| 2001/0028363 A1 | 10/2001 | Nomoto et al. |
| 2002/0055946 A1 | 5/2002 | Prager et al. |
| 2002/0065784 A1 | 5/2002 | Ranzini et al. |
| 2002/0087646 A1* | 7/2002 | Hickey et al. .............. 709/206 |
| 2002/0141560 A1* | 10/2002 | Khayatan et al. ........... 379/219 |
| 2003/0028585 A1 | 2/2003 | Yeager et al. |
| 2003/0056093 A1 | 3/2003 | Huitema et al. |

* cited by examiner

```
# url    : XSLT-file  xml1 xml2 xml3
/       : index.xsl  groups
/group  : group.xsl  groups directory
/queue  : queue.xsl  queue
```

DATA REPLICATION SYSTEM AND METHOD

This application claims priority under 35 U.S.C. § 119(e) from provisional application Nos. 60/364,648 filed Mar. 15, 2002, 60/382,659 filed May 22, 2002 and 60/443,239 filed Jan. 28, 2003 respectively. The provisional applications are incorporated by reference herein, in their entirety, for all purposes.

GOVERNMENT RIGHTS

This invention was made with Government support under contract F30602-02-C-0204 awarded by the Air Force. The Government has certain rights in this invention. The U.S. Government has a paid-up license in this invention and the right in limited circumstances to require the patent owner to license others on reasonable terms as provided by the terms of contract F30602-02-C-0204 awarded by the Air Force.

FIELD OF THE INVENTION

This invention relates generally to replicating files over a network. More particularly, the present invention is a method and apparatus for permitting members of a group to replicate data in the form of files over a network in a secure manner with knowledge of changes made to the files by other members of the group.

BACKGROUND OF THE INVENTION

The Internet was launched over thirty years ago. Many advances in technology have ensued and many applications have evolved, and yet some technologies have change very little over the years. Today, e-mail is the primary means of communication between users of the Internet. While augmented by instant messaging, the fundamental technologies have changed little. Moreover, files are stilled shared using the file transfer protocol ("FTP") or as attachments to electronic mail. Users receive little information about the files that are sent to them or which they download. Where file sharing is part of a collaborative effort among a number of authors, it is important that participants in that effort know the file "status", which includes when the file was last changed, what was changed, who made the changes, and who has knowledge of the changes. Additional information useful to participants in the collaborative effort includes the evolution of the file and statistics on resources used to create the file at each point in its evolution. The file transfer systems currently in use today either do not provide the file status or file history in any meaningful detail or require that file transfer functions utilize a central server accessible by all participants in the collaborative effort.

One approach to collaboration is by using an Internet-based web server. Various server-based offerings were implemented in the early days of the Internet. Some of these programs combined address books, bulletin board, file sharing, discussions, project management, and other typical collaboration tools together into a hosted solution.

Hosted solutions were viewed has having the great advantage of not requiring IT installation and support while easily supporting communications between people at different companies behind firewalls. However, hosted solutions never became prevalent for a variety of reasons. One of the problems was that of scale. Since all of the users were required to connect to the same servers, the maximum number of users that service could handle was limited by the computing power of the servers used. Yahoo serves as a case in point. During the growth of the Internet in the 1990s, it spent virtually all of its computing resources ensuring that response time was acceptable for the growing number of users of the Internet.

Another problem with the hosted solutions is the location of the intellectual property. The hosted systems require that a participant's documents (intellectual property) be placed on a third party's server, thus raising significant policy questions for participants. Similarly, that intellectual capital may not really be preserved in the long run because it cannot be moved inside the organization.

Some of the hosted solutions offer sales of their servers to enterprises. While that sometimes provides a good Intranet solution, it places the organization in the same business as the hosted provider and requires that they make their collaborative servers accessible on the Internet for any work between organizations. It also creates a single point of failure—if the collaboration server fails, all of the data is inaccessible until the server is restored from backup.

A second approach based on peer-to peer (P2P) technology emerged in 2000. Groove Networks, Endeavors Technology, Roku, and others created a means for sharing information without requiring that all information be saved on a central, hosted server. These companies focused on direct connections between individual client systems and offered either access to files or replication of files. Each of these companies created a switch of sorts—a system that clients could connect to using an outbound connection and then routed requests between connected systems. This is virtually identical to the way that Instant Messaging services provided by Yahoo and AOL work.

While these solutions resolved many of the problems caused by firewalls, the solutions had problems of their own. First, scale again is an issue—none of the solutions focus on scale—their primary concern is functionality rather than building huge switches. In contrast, the reason that AOL Instant Messenger and Yahoo Instant Messenger work is because their functionality is trivial and the bulk of the computing resources are applied to providing enough computer power to move messages between users with a minimum of latency. In order to make a technology like Groove or Endeavors work, the company would have to virtually dedicate itself to making fast switches.

Further, client computers systems do not have the same operational characteristics that servers do. They are often turned off on a regular basis. They may not ever have the same IP address or may shift from network to network. They will also have varying bandwidth. Mobile users may have high speed Internet at the office but dial-up from the road. The performance of direct connections between systems, then, is often problematic.

There have been several efforts relating to data synchronization and transport between systems, including efforts that deal with high latency connections. A UCLA project called Ficus involved file replication within a LAN environment. This was implemented through a file system layer within Unix, requiring kernel modifications, and thus being dependent on the specific version of Unix. Trusted Information Systems and UCLA married the security aspects with the file sharing of Ficus into a later project called Truffles. This eventually evolved from its kernel level implementation to a user level, background process implementation, initially called Rumor and ultimately (with the security pieces) called User Level Truffles (ULT). Truffles/Ficus used a connection-oriented protocol to move information instead of the store and forward messaging infrastructure. Several other replication projects exist, including rsync, which focus on replication in both high and low bandwidth environments. None use the messaging infrastructure as a channel for data transmission, but some of these systems offer techniques for synchronization.

Another approach is taught by PCT Application WO 01/16804 filed by Chandhock et al. entitled "Maintaining Synchronization in a Virtual Workspace" (herein, Chandhock). Chandhock teaches the sharing of files among members of a workgroup via email messages that include a synchronization command in the embedded in the multipurpose Internet mail extension (MIME) of the email header and a MIME file attachment. Upon detection of an add or update synchronization command in a message from a group member, a user agent will determine whether a local copy the MIME file attachment resides on the recipient's computer. If a local copy of the attached file exists, the user agent makes a backup copy of the local file and saves it to a specified directory, then replaces the recipient's copy of the attached file with the sender's copy. According to Chandhock, files may be shared and synchronized in this way among group members.

Implicit in the approach taken by Chandhock and other is that synchronization of shared files among members of a group is achievable. In this context, "synchronization" means the sharing of a file that is believed by members of the group to be the same file. When a member of the group makes a change to the file, the changed file is conveyed to all other members and the changed file replaces previous versions of the file as stored by the other group members. In a "synchronized" environment, there is only one file, and all members are believed to possess it.

If this definition is what is meant by synchronization, then true synchronization may be unattainable. In a group of three or more members, it becomes increasingly difficult to be confident that a file possessed by one member is the latest version. Members may make changes and exchange files at approximately the same time resulting in multiple versions of the file to exist at the same time. This is not synchronicity.

Applicant, in previous writings it used the term "synchronizing" to describe the behavior of Applicant's system, which was not really a synchronizing files at all. In fact, Applicant's system was in reality a data "replication" system and method. "Replication" in this context refers to the copying of a version of a file from one member's system to the system of all other members of a group without requiring that existing versions of that file be replaced. Accordingly, in this application Applicant has adopted a lexicon that describes a process of file exchange in terms of "replicating" files among group members.

What would be particularly useful is a system and method for the formation of groups, each member of which is trustworthy, and for the secure replication of information among members of the group without the need for a central server. The system and method would additionally permit participating members to determine the most current information in the possession of that member.

SUMMARY OF THE INVENTION

An embodiment of the present invention is a data replication system (DRS). The DRS comprises two layers—an application layer and a communications layer. The communications layer implements a message redirector and collects DRS messages for the application layer. The application layer handles the DRS messages in the context of whatever application it implements. In one embodiment, a DRS message is used within an e-mail system to form groups and replicate files among group members participating in a collaborative effort. In this embodiment, the e-mail stream passes through a message router comprising an application layer interface. The message router extracts DRS messages while allowing e-mail messages to pass. Once extracted, the DRS message is parsed and instructions conveyed by the DRS message are implemented by a command processor. Command sets comprise instructions for both group formation and file management and update.

It is therefore an aspect of the present invention to facilitate the formation of groups of trustworthy members through the exchange of invitations among potential group members.

Another aspect of the present invention is to facilitate the replication of files among members of a group in a secure environment.

It is yet another aspect of the present invention to facilitate the efficient replication of files among group members by capturing changes to a version of a file in a patch and sending the patch to members of the group.

It is still another aspect of the present invention to apply a patch to a version of a file in the possession of a group member only after determining if that version of the file in the possession of the group member is the same as the version of the file used to create the patch.

Another aspect of the present invention is to permit the reconstruction of a version of a replicated file by maintaining a database of patches.

It is still another aspect of the present invention to associate a file status with a replicated file wherein the file status identifies the date of the last change made to the file, the identity of the user making the last change, and the identity of the users who have knowledge that the change was made.

It is a further aspect of the present invention to permit a group member to reconcile divergent versions of a file by identifying the structure of a file and merging the divergent versions of a file to create a reconciled version.

It is still a further aspect of the present invention to utilize existing network protocols for the file transfer and to facilitate file replication on an ad hoc basis wherein a third party intermediary is not required.

It is still another aspect of the present invention to facilitate file replication on a peer-to-peer basis between and among users of a network accessing the network through computers, personal data assistants, cell phones, and similar devices.

It is yet another aspect of the present invention to facilitate file replication between and among users of a network wherein the users have defined rights of access to the replicated file and have defined permissions relating to changing a replicated file.

It is a further aspect of the present invention to provide trading partners the ability to communicate the status of a transaction.

It is another aspect of the present invention to establish permissions to access files in an asymmetrical manner so as to establish controls over documents comprising multiple files.

It is yet another aspect of the present invention to provide additional information useful to group members participating in the collaborative effort which includes the evolution of the file and statistics on resources used to create the file at each point in its evolution.

It is a further aspect of the present invention to incorporate routing instructions in a group member's profile, thereby permitting files to be automatically routed to a third party group member once received by a group member recipient, together with the appropriate file status information noting changes to the version being routed.

These and other aspects of the present invention will become apparent from a review of the general and detailed descriptions that follow.

An embodiment of the present invention is a data replication system (DRS). The DRS comprises two layers—an application layer and a communications layer. The communications layer implements a message redirector and collects DRS messages for the application layer. The application layer handles the DRS messages in the context of whatever application it implements. In one embodiment, a DRS message is used within an e-mail system to form groups and replicate files among group members. In this embodiment, the e-mail stream passes through a message router comprising an application layer interface. The message router extracts DRS messages while allowing e-mail messages to pass. Once extracted, the DRS message is parsed and instructions conveyed by the DRS message are implemented by a command processor. A group of instructions comprises a command set. In an embodiment of the present invention there are command sets for both group formation and file management and update.

In an embodiment of the present invention, group formation is managed by a group formation and management command set. Commands are inserted in an email header. When detected, the commands are forward to and implement by a command processor. Potential new members of a group are "invited" to join the group by an existing member. If the invitation is accepted, the invitee is now a "new member." The inviting member sends a "welcome" message to the new member, which welcome message comprises a group membership list. The new member sends an "introduce" message to each group member identified on the inviting member's group membership list. An existing member of the group (other than the inviting member) accept the new member by sending a "welcome" message and a copy of the group membership list according that member. In this way, the new member establishes a relationship with each of the existing group members.

In another embodiment, the invitation and acceptance message exchange is accompanied by an exchange of public keys. In yet another embodiment, a third party manages the key exchange.

In still another embodiment, the replication of files is managed by a file replication data set. A tag comprising instructions is inserted into an email identifying the message as a DRS message. When detected, the instructions are forwarded to and implemented by a command processor. Each member of a group designates a directory where files that are to be replicated are stored. The DRS computes signatures and patches as it detects changes in a local file. Each time an exchanged file changes, a new hash, signature and patch are computed and stored. The hash and the patch are transmitted to all of the other members of the group. The hash value is compared to the hash value of the file targeted for update and, if they match, the patch is applied. The patch messages comprise a binary differential representing the changes made to the targeted file. The hash value is compared to the hash value of the file targeted for update and, if they match, the patch is applied. This mechanism is backed up with a database of patches and signatures. Each version of the file generates an additional patch and signature, which are used to apply changes as patches arrive. Because of this, the database can be used to generate any previous version of the files within. Similarly, file versions that are created from receipt of PATCH messages are also stored in the database. This provides a complete version history of a single file. Every patch record is tagged with the email address identifying where the file change came from.

In another embodiment, the shared files are part of a larger shared document. Participating members have different rights with respect to the document and its component shared files. In this embodiment, a participating member with document control authority can limit the component shared files that are readable and editable by each participating member. Additionally, until the participating member with document control approves of a modification by another participating member, the modification is noted as pending and the document is presented as unchanged.

In still another embodiment, the shared file may be replicated by a participating member to others within that member's organization on an automated basis. This is accomplished by the participating member who is a member of, for example GROUP 1 comprising members inside and outside of that member's organization. That member forms another internal group, for example GROUP 2, comprising internal members only. When a file is replicated into the participating member's file as a result of that member being in GROUP 1, it is automatically replicated into the files of those members of the participating member's internal organization, GROUP 2. Thus the present invention can permit this replication to occur in an automated way so that a chain is formed from the participating member, as a member of GROUP 1, to those in that member's organization GROUP 2. Thus the recipients within the member's organization GROUP 2 can be assured that the replicated file is coming from a trusted source. In this instance the participating member is designated as both a recipient and a source of files, allowing the replication to occur. Thus secure, private distribution of a file from an external source is achieved.

DETAILED DESCRIPTION OF THE INVENTION

An embodiment of the present invention is a data replication system (DRS). The DRS comprises two layers—an application layer and a communications layer. The communications layer implements a message redirector and collects DRS messages for the application layer. The application layer handles the DRS messages in the context of whatever application it implements. In one embodiment, a DRS message is used within an e-mail system to form groups and replicate files among group members. In this embodiment, the e-mail stream passes through a message router comprising an application layer interface. The message router extracts DRS messages while allowing e-mail messages to pass. Once extracted, the DRS message is parsed and instructions conveyed by the DRS message are implemented by a command processor. Command sets comprise instructions for both group formation and file management and update.

Figure 1:
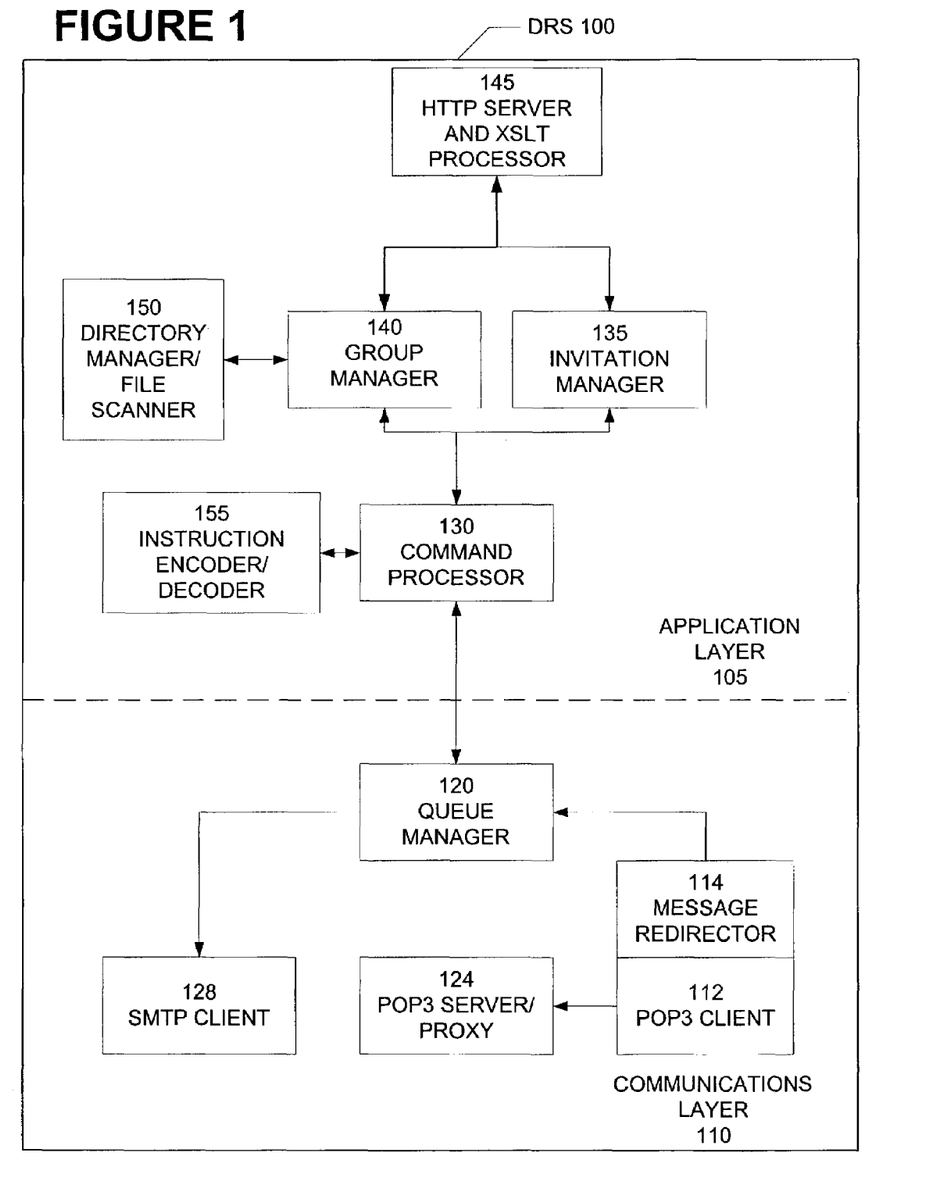
FIG. 1 illustrates the basic architecture of a data replication system according to an embodiment of the present invention.

Referring to FIG. 1, a data replication system (DRS) 100 according to an embodiment of the present invention is illustrated. The DRS 100 comprises two layers—an application layer 105 and a communications layer 110. The communications layer 110 comprises a POP3 client 112, a message redirector 114, a queue manager 120, a POP3 server/proxy module 124 and a SMTP client module 128. The applications layer 105 comprises a command processor 130, an invitation manager 135, a group manager 140, an HTTP Server and XSLT Processor 145, a directory manager/file scanner 150, and an instruction encoder/decoder 155. The queue manager 120 exchanges DRS messages with the command processor 130 of the application layer 105.

The communications layer 110 manages the connectivity between nodes of DRS software. Using e-mail addresses as an identifier, DRS nodes communicate with each other by sending e-mail messages. Because most e-mail addresses are associated with individuals using e-mail accounts, the communications layer 110 is implemented as a message redirector, retrieving DRS messages from an e-mail server and routing the other messages to the e-mail client.

In one embodiment of the present invention, a DRS message uses an x-header in MIME format to distinguish DRS messages from ordinary e-mail messages and to encode their content. For purposes of illustration and not as a limitation, an x-header would be in the form x-drs. The x-drs header in conjunction with message redirector 114 operates as a simple switch, indicating that the message is a DRS message instead of a common e-mail message. In this embodiment, the actual DRS message is encoded in XML for convenience. The MIME-type of an attachment is not the generic text/xml, but rather is x-drs/instructions to enable different message encodings other than XML.

As will be appreciated by those skilled in the art, other means may be used to distinguish DRS messages from ordinary email messages without departing from the scope of the present invention. By way of illustration, the "subject" line or the attachment file name may incorporate a tag or unique string that identifies the email message as DRS message.

In an embodiment of the present invention, the DRS message comprises three non-application specific components: the ID, the FROM, and the TO elements. The ID, a transaction ID, is a Universal Unique Identifier (UUID). In this embodiment, the UUID is generated using ISO-11578, but this is not meant as a limitation. As will be apparent to those skilled in the art, other means of generating a unique identifier may be utilized without departing from the scope of the present invention so long as no other transactions for a particular application will see the same transaction ID. The FROM and TO elements identify the original sender and intended recipient of the message. These elements are embedded in the message to enable it to be routed through a third party if necessary.

The communications layer 110 further comprises modules that implement specific e-mail protocols—SMTP, POP3, and IMAP4 (only POP3 modules are illustrated in FIG. 1). Because the communications layer 110 functions as a message redirector, both client and servers for these protocols are implemented in the system.

The POP3 client module 112 retrieves e-mail messages from the user's e-mail server. It implements the core POP3 protocol elements, enabling e-mail server login, message header retrieval, message retrieval, and UIDL retrieval. The POP3 client module 112 can be activated using one of two methods—the proxy method or the side-by-side method.

When the DRS POP3 server module 124 receives the user id and password, it parses out the e-mail server from the user id and uses that information to connect to the real e-mail server using the POP3 client module 112. The POP3 client module 112 then connects to the actual e-mail server and retrieves the headers for each of the e-mail messages on the server. Any messages that have an x-drs header are retrieved, posted to the queue manager 120, and deleted from the e-mail server. The remaining message headers are stored in a local table within the POP3 client module 112 and are numbered sequentially. Since POP3 servers do not actually delete message numbers until the QUIT command is issued, the POP3 client module 112 must maintain a lookup table mapping the message numbers presented to the e-mail client with those actually on the e-mail server.

This effectively removes all DRS messages from the perspective of the e-mail client. The POP3 server/proxy module 124 then uses the POP3 client as a proxy, passing through most requests back to the actual e-mail server. Certain POP3 commands are intercepted and handled all or partially in the POP3 client module 112. For example, the POP3 command RSET will undelete messages. Since the desired effect is to undelete only those messages that the e-mail client is aware of, RSET only removes the deletion mark from the local table.

The side-by-side method has similar functionality except that the POP3 client module 112 is triggered with a timer instead of with the POP3 server/proxy module 124. In this case, the user does not need to alter their e-mail settings, but may see DRS messages in their inbox. The side-by-side method works well for advanced e-mail clients like Outlook, where a user can filter out the DRS messages manually. It also works well when the e-mail client connects to an IMAP4 or Exchange server, where the messages may briefly show up in the e-mail client before being deleted from the server.

When the side-by-side method is enabled, the user must configure the DRS software with all of the e-mail account information necessary to make the connection. This includes the user id, password, e-mail server name (both POP3 and SMTP) and user's e-mail address (typically not a combination of the user id and e-mail system name). In contrast, the proxy method requires an alteration to the e-mail client's configuration, but only requires the user's e-mail address and the SMTP server name.

In side-by-side mode, the POP3 client module 112 runs every few minutes (a configurable setting) and retrieves the DRS messages from the e-mail server and then deletes them. Any messages retrieved are posted the queue manager 120 for handling.

The queue manager 120 runs two queues—an inbound queue and an outbound queue. These two queues play different roles in the operation of the DRS 100.

The inbound queue accepts messages from the POP3 client module 112 and posts them to the application layer's command processor module 130 for handling. Aside from the contents of the message, the queue manager 120 must be told the ID of the message and the sender for inbound messages. Inbound messages are processed by a background thread that cycles through the inbound queue periodically. Messages that fail processing are held in the queue for retry.

Inbound messages can be retained in the queue's persistent store, allowing the POP3 client module 112 to asynchronously retrieve and post messages. The queue's persistent store serves as an excellent backup mechanism should the client system fail. But most important, the queue helps manage out-of-sequence messages. While not generally visible to e-mail users, most e-mail clients automatically order messages by the date they were sent. This leads to the presumption that the e-mail messages were actually delivered in that order, which is often not the case. In fact, e-mail messages are typically delivered in order of size—the smaller ones are transmitted from server to server more quickly by SMTP nodes if they open up multiple connections, while larger messages take longer to deliver. In an embodiment of the present invention, the inbound queue allows messages to be held and processed in the proper order.

The outbound queue is responsible for transmitting messages to the recipient using the SMTP client module 128. This queue exists to provide both a background process to asynchronously e-mail the DRS messages as well as handling the situation where the DRS is operating in disconnected mode. The DRS outbound queue will periodically attempt to connect to the outbound e-mail server and send the messages in its queue.

The application layer 105 of DRS implements the group file replication elements of the system. The group file replication elements implement a protocol wherein files associated with a group by each group member are replicated on every other group member's system. Groups are identified by a title, description, and UUID, ensuring that titles do not have to be unique in the system. A group is created by one individual, who then invites others to join the group. Each user is identified by his/her e-mail address. Files are associated with a group by being stored in a designated directory location. Files are also associated with a group member such that the files of the recipient are not overwritten by the receipt of a file from a group member.

Figure 2:
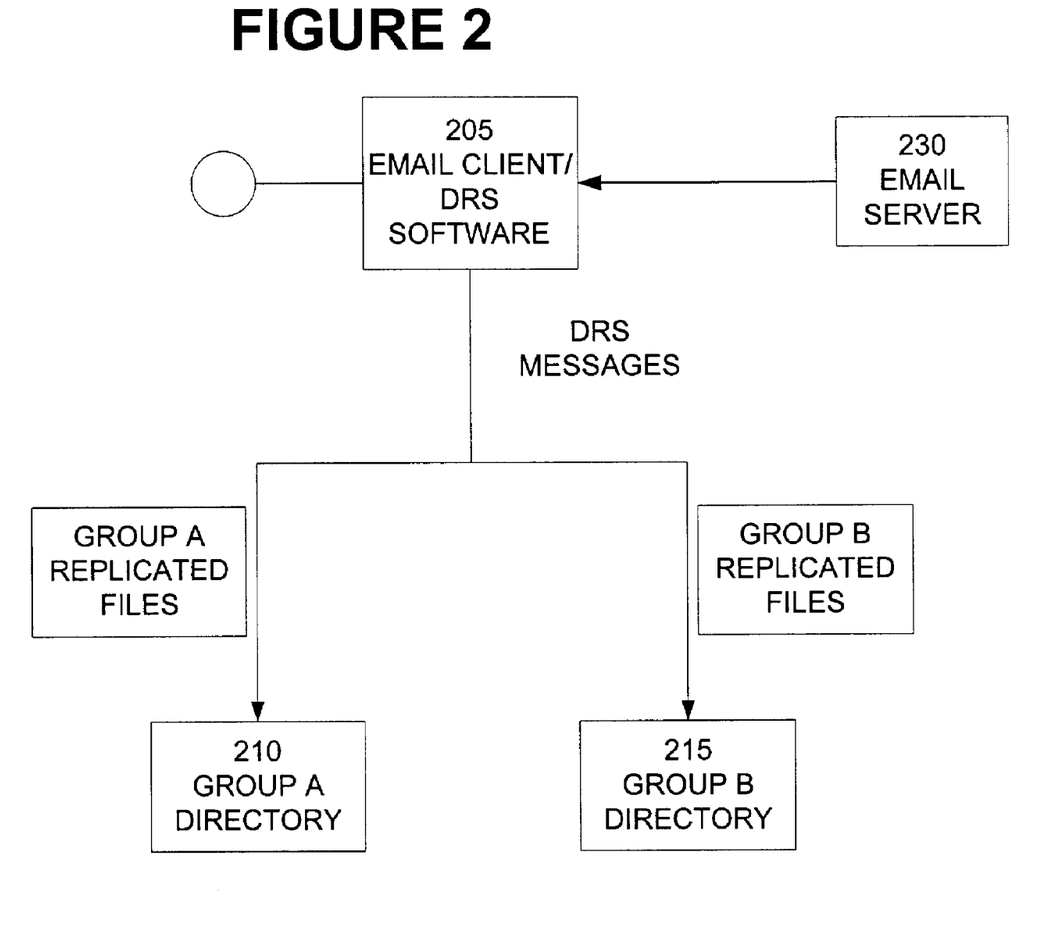
FIG. 2 illustrates an implementation of a data replication system in a user environment according to an embodiment of the present invention.

Referring to FIG. 2, an implementation of a DRS 100 in a user environment according to an embodiment of the present invention is illustrated. Email from e-mail server 230 is received by e-mail client/DRS software 205 where DRS messages are identified and routed. As illustrated, the user of e-mail client/DRS software 205 is a member of two groups and has designated a group A directory 210 and a group B directory 215. Email client/DRS software 205 routes replicated files received from members of group A to the group A directory 210 and routes replicated files received from members of group B to the group B directory 210. Each the file in a directory is presumed to be replicated among members of a group. Thus, any change made to a file in the group A directory 210 will be replicated in the comparable directory of all of the members of group A. The mechanism by which this replication occurs is described below.

The group formation and file replication functions are built into a single command processor module. Interacting with that module is a set of application specific modules that handle each of the processes necessary to manage groups, update files and directories, process invitations and interact with the user.

In an embodiment of the present invention, the communications and application functionality are separated. This means that the message redirection components need no knowledge of the application protocols. This attribute permits other applications take advantage of the DRS communications layer.

In an embodiment of the present invention, the command processor implements the complete command set for the group file replication application. In this embodiment, each message posted to the command processor is encoded in XML, which the instruction encoder decodes into a memory-based structure. The message is expected to contain the required elements for the communications layer (ID, FROM, TO) as well as these group file application specific elements: GROUP, VERB, ARGUMENTS, CONFIRM, and LAST. The GROUP element identifies for which group the message is intended. The GROUP element, as mentioned earlier, contains the group's UUID. This ensures the correct disposition of the enclosed action. The VERB element is the action that will be applied to the group. The ARGUMENTS are specific to the particular action specified in the VERB, although all arguments are designated in name/value pairs. There are currently twelve (12) verbs, plus ACK and NAK, organized into three groups or command sets.

Figure 3:
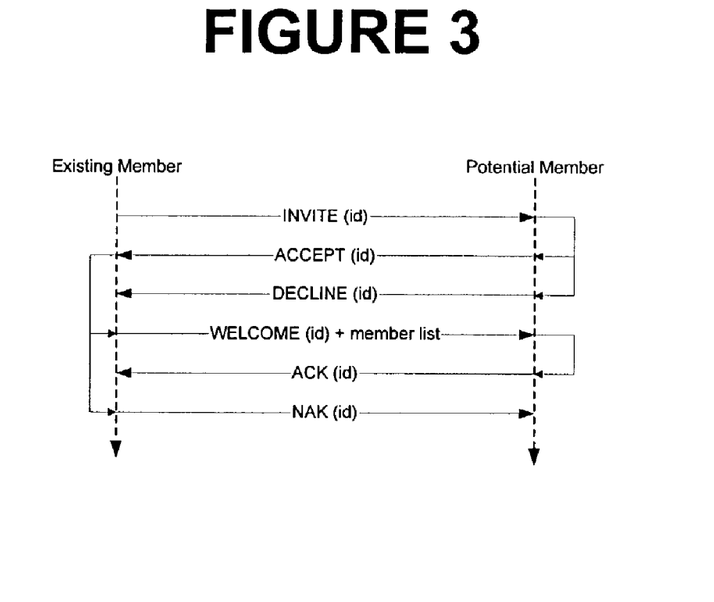
FIG. 3 illustrates an invitation process according to an embodiment of the present invention.

The first command set comprises the actions for group formation and management. The following verbs belong to this command set:
 a. INVITE
 b. DECLINE
 c. WELCOME
 d. ACCEPT
 e. INTRODUCE
 f. QUIT
 g. REVOKE Referring to FIG. 3, an invitation process according to an embodiment of the present invention is illustrated. An existing member sends the potential member an invitation message that comprises an INVITE action. When a potential member is invited to join a group, the INVITE action comprises only the group's UUID, title, and description. It does not comprise a member list. This information is sent after the potential member accepts the invitation when the inviting member sends a WELCOME action that contains the membership list. The ID for each of these transactions is the same, since this is viewed as the same transaction repeated with two acknowledgements. If for some reason the potential member sends an ACCEPT message for a group to which he/she was either not invited to or expelled from, the existing member can send back a NAK indicating a failure to ACCEPT. After a new member has accepted the invitation and receives the member list, the member uses the INTRODUCE action to introduce him/herself to the other group members.

Figure 4:
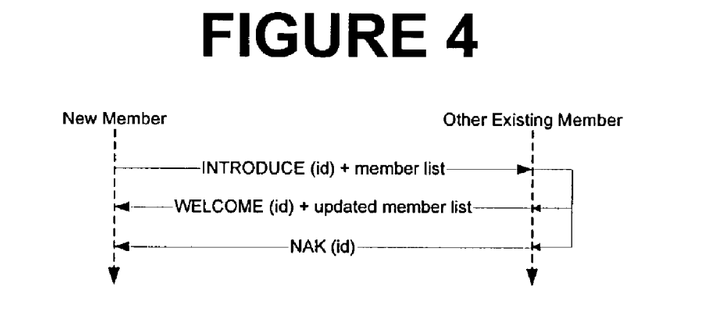
FIG. 4 illustrates an introduction process according to an embodiment of the present invention.

Referring to FIG. 4, an introduction process is illustrated according to an embodiment of the present invention. In the introduction cycle, a new member sends the INTRODUCE message to other existing members. This message is essentially a request that each member reveal his/her list of known members. This helps manage the problem of some members not knowing about other members. The new invitee then updates his or her list of members and possibly sends out introductions to those additional members. Two additional messages (not illustrated) are part of the group formation suite—QUIT and REVOKE. The REVOKE verb is used to revoke the membership of a group participant. It is sent to all members of the group, identifying which group member is no longer on the list. An ACK is expected in response from all members except the one from whom membership was revoked. The QUIT verb is used to indicate that a member is leaving the group voluntarily. It is also used as a response to messages containing group IDs to which the user doesn't belong. This can happen occasionally in this system because of the latency in data transmission between group members.

In another embodiment of the present invention, a second instruction set comprises the actions for file management and update:
a. PATCH
b. ERASE
c. REQUEST Each of these actions simply requires an ACK for a successful response or a NAK for an unsuccessful one.

The PATCH action contains a set of bytes that either creates a new file or updates an existing one. In an embodiment of the present invention, the PATCH action for files smaller than 1 MB is a single transaction, while those larger than 1 MB are split into multiple blocks and sent as a series of PATCH messages. However, this is not meant as a limitation. As would be apparent to those skilled in the art, other schemes for conveying patches of varying size may be utilized without departing from the scope of the present invention. Each PATCH action consists of a group identifier, the name of the file to update or create, two hash values, and the patch data. The hash values represent the before and after hashes for the patch. If the "before" patch is zero length, then the patch contains the data necessary to create a new file. If the hash value of the updated file does not match the "after" patch, then the PATCH action fails and a NAK is returned.

As noted above, in an embodiment of the present invention, PATCH actions for files larger than 1 MB are split into 1 MB chunks and transmitted individually. The first block is sent in a "master" PATCH. That message contains a tag indicating that the PATCH action is a "master" action and includes a count of the total number of blocks in the entire patch. In addition to that header information, the "master" PATCH message contains the first block of the transmission. Other blocks are each sent in "partial" PATCH messages, identifying which block number the message contains. The "master" PATCH is not processed until all of the "partial" PATCH messages have been received. At that point, the data blocks are reassembled and then applied to update or create the file.

The ERASE verb simply removes a file from the group. In addition to the name of the file to erase, the ERASE action also holds a hash value. This hash value is used to ensure that the file to be erased is the same file that the sending system has erased. If the hash values are different, the file is not erased and the action fails.

The REQUEST verb is designed to allow a group member to reconcile an exchange of modified documents by asking for files or patches to be resent. The REQUEST can be acknowledged with an ACK. Upon receipt, the files identified in the REQUEST action are to be sent to the requesting group member.

In another embodiment of the present invention, a third instruction set comprises the actions for transaction management:
a. REQTRAN
b. NOOP The REQTRAN action is used to request a missing transaction. Since e-mail is not a perfect transmission medium, it can be anticipated that messages will be lost in transmission. The REQTRAN verb simply requests that a particular transaction ID for a group be resent. If the transaction ID does not exist, then a NOOP is currently returned so that the request is satisfied.

The REQTRAN plays an important role in all of the transaction processing because it is coupled with an optional LAST tag in each of the messages. The LAST tag identifies the transaction ID of the message preceding the message currently being processed. This ensures that the order of the messages is preserved even though the messages may not have been delivered in order. Not all messages require a LAST tag (INVITE, for example), but all of the messages that operate on files, either updating, erasing or creating them, require that the predecessor transaction be identified.

In an embodiment of the present invention, file replication is accomplished by creating a basis file and then applying patches made up of binary differentials. The DRS computes a digital signature and patch as it detects a change in a local file. Each time a replicated file is changed, a new hash, signature and patch are computed and stored. The hash and the patch are transmitted to all of the other members of the group. The hash value is compared to the hash value of the file targeted for update and, if they match, the patch is applied.

This mechanism is backed up with a database of patches and signatures. Each version of the file generates an addition patch and signature, which are used to apply changes as patches arrive. Because of this, the database can be used to generate any previous version of the files within. Similarly, file versions that are created from receipt of PATCH messages are also stored in the database. This provides a complete version history of a single file. Every patch record is tagged with the e-mail address identifying where the file change came from.

Because it is possible that the same file might be changed simultaneously, the database is structured as a tree of version information. If a patch arrives and the target file is not the same version, the DRS system can use the "from" hash in the PATCH message to walk through the version history to find the records necessary to rebuild the basis file. The new patch can be stored in the database alongside all of the other patches. On demand, the system can generate that version of the file or any other.

In one embodiment of DRS, concurrent updates generate parallel versions and reconciliation of the different versions is left to the user. This will be entirely satisfactory in many cases, partly because the probability of conflict is usually very low and partly because the users will easily be able to merge the different versions. In another embodiment, the structure of a file is determined and hooks are provided to merge concurrent files automatically.

By way of example, a distributed web logger—or "blog" in informal lingo—comprises entries identified by contributor. Each entry is a paragraph of text and it is considered acceptable for the ordering of the paragraphs to be approximate. Blogs are particularly interesting in the context of DRS because they can be used within a group to provide commentary about the changes of more formal files such as Word documents or Excel spread sheets.

Referring again to FIG. 1, the group manager 140 and invitation manager 135 act as data accessing modules, responsible for managing persistent storage. The group manager 140 creates and manipulates groups, while the invitation manager 135 does something similar for invitations. A small amount of management in the invitation manager 135 is set for handling multiple invitations to the same group—currently these are collapsed into a single invitation. Neither of these modules is an "active" module— they do not run on background threads. However, the group manager 140 is responsible for starting up the monitoring threads for the directory manager 150 as the groups are enabled.

The directory manager 150 monitors the files in a replication directory to determine if any of the files have been changed. If a file has changed, the directory manager 150 starts the process of computing a version change—a signature and patch are computed for the file and then stowed in the database that holds those values. The patch is then forwarded to the command set for transmission.

In an embodiment, the directory manager 150 is not tied to group membership. When patches are posted, the command processor receives the file's location instead of its group ID. This allows the replication directory files to participate in more than one group. When the file updates are transmitted, the location is resolved into one or more group IDs.

In addition to supporting a common Windows user interface, the DRS contains a small web server with a built-in Sablotron XSLT processor. The web server is wired through an initialization file that specifies the url, the XML to retrieve and the XSLT to apply.

Figure 5:
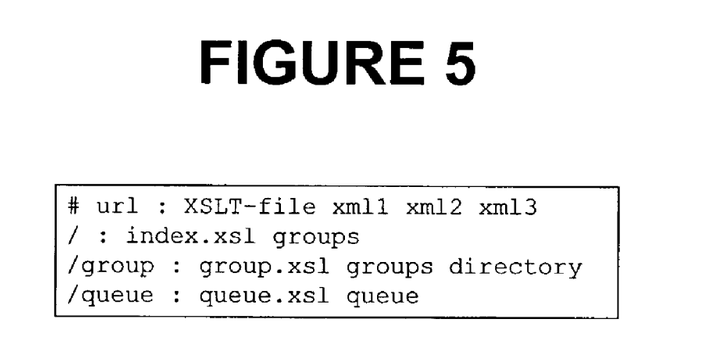
FIG. 5 illustrates a structure of an exchanged file according to an embodiment of the present invention.

FIG. 5 illustrates a structure of an exchanged file according to an embodiment of the present invention. The root url ("/") is tied to the index.xsl file and the "groups" XML. This instructs the URL handler to retrieve the information from the group manager in XML format and apply the index.xsl XSLT style sheet. The retrieval of XML data from the different system manager may also include parameters. Each XML retriever has a different selection of parameters available. The HTTP server provides support for interprocess communications and remote access.

In yet another embodiment, the DRS uses a key exchange process to provide security. Each node of the Data Replication Service generates an RSA (or similar) key pair for the user of that node. It also maintains a key ring for the user, associating keys with e-mail addresses. Keys will be added to the ring initially through the process of group invitation—when an invitation is sent, it will include the public key of the member. When the invitation is accepted, the public key of the new member is returned to the existing group member. In one embodiment, keys are generated and used without third party signers. In yet another embodiment, key exchange is managed by the use of certificates and trusted third parties.

Once keys are exchanged, all messages between the group members are encrypted. The focus of message encryption will be the core message body in the x-drs/instructions packet, rather than attempting to encompass all of the capabilities of S/MIME.

In another embodiment, a DRS routes information between groups. Since two groups may replicate the same set of files, the opportunity exists to route changes made by one group to the members of another group. Instead of viewing the replication relationship as the equivalent of a distributed implementation of a set of replicated files, the overlapping group relationships become something akin to routers. For example, two or more people who are in different organizations may set up a replication relationship, and then one of them may replicate the files with an internal group.

In another embodiment of the DRS, transport protocols other than e-mail are used where appropriate. For example, in one embodiment, where direct connection among peers is possible, more traditional protocols such as FTP can be used.

In another embodiment, replication of files is accomplished among cell phones and other devices using Short Message Service (SMS).

An entirely different form of routing is possible for propagation of updates. In the present design, each node automatically sends its updates to all of the others in the same relationship. However, in some environments, it may not be possible to address or route changes between any two participants. For example, if direct connections are being used, but some participants had only limited connectivity or could interact directly with only some of the participants, changes could be pushed out with instructions to relay them to the other participants.

In another embodiment, the "replicated file" is an executable and the message redirector (FIG. 1, 114) permits the user of the sending computer to control the receiving computer remotely using inbound SMS messages.

Figure 6:
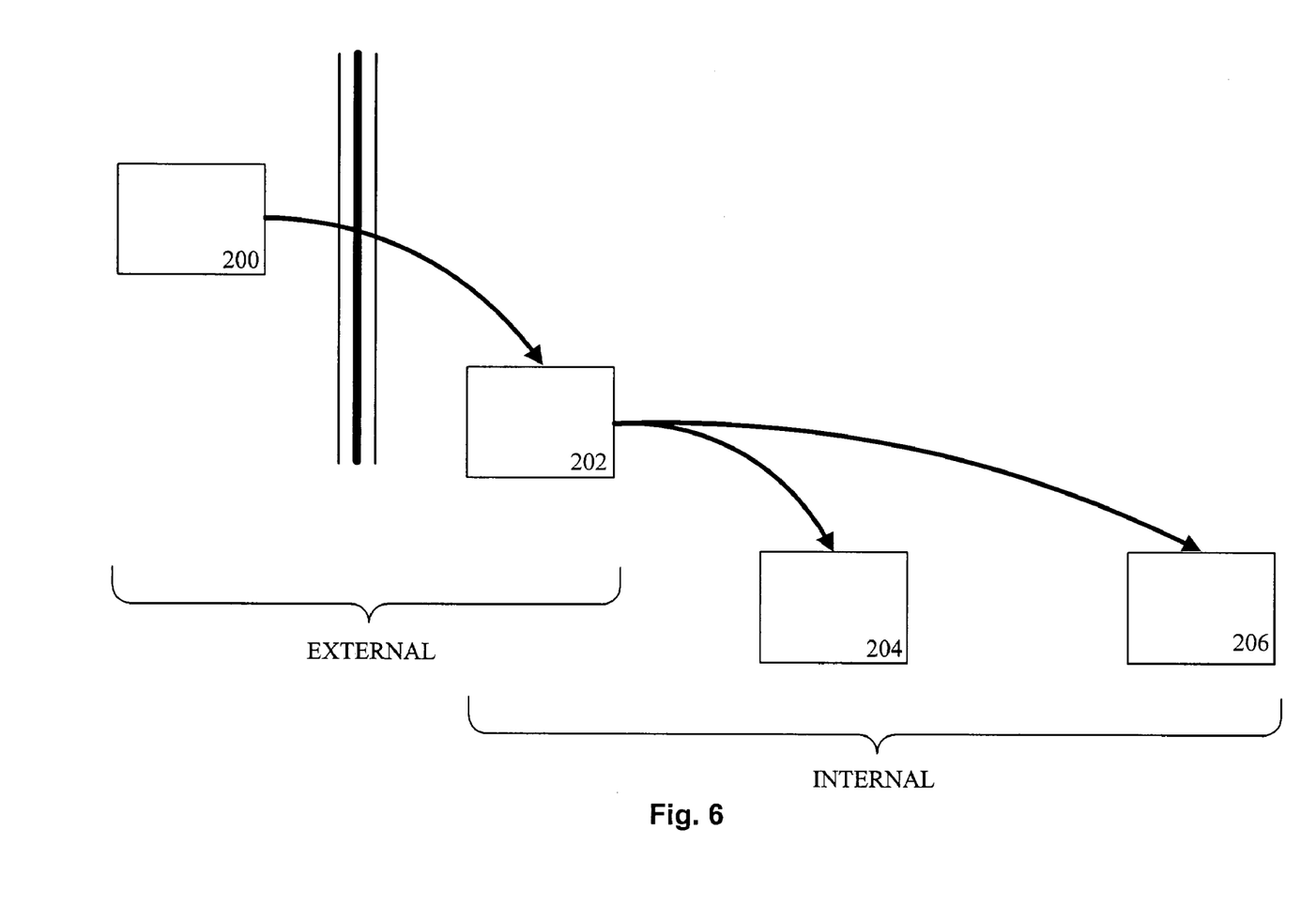
FIG. 6 illustrates the internal routing of files originating from an external source according to an embodiment of the present invention.

Referring now to FIG. 6 the internal routing of files originating from an external source is illustrated. In this instance the concern for those within an organization using a document related to whether that document is from a trusted source or not. If it is not, and is propagated through an organization, a virus may be spread, or erroneous information on which decisions are based may be propagated throughout the organization. To assist in the replication of files from trusted sources, the present invention allow for groups to be "chained" together. Members 200 and 202 are part of a trusted group. Member 202 may also be a member of another group internal to that member's organization here illustrated as a group comprising internal members 202, 206, and 206. When a file is replicated in to the file of member 202 by virtue of its membership in the group comprising 200 and 202, it is automatically replicated into the files of the internal group comprising 202, 204, and 206. Thus two groups are chained together. In this case group member 202 is designated as both a recipient and a source of files. It further accomplished the objective of providing confidence to group members 204, and 206 that the files being received are from a trusted source even if the files are originating external to the organization of which 204 and 206 are members.

A data replication system and method have now been illustrated. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

We claim:

1. A method of facilitating the formation of groups of trustworthy members via a network, the method comprising:

inserting an invitation command into the header of a first e-mail message originating from a device of an inviting group member, the device having access to the network;

sending the first e-mail message via the network to the e-mail client of an invitee;

detecting the invitation command at the invitee's e-mail client;

inserting an accept command into the header of a second e-mail message originating from a device of the invitee;

sending the second e-mail message via the network to the e-mail client of the inviting group member; and detecting the accept command at the inviting group member's e-mail client, wherein the invitee becomes a new group member.

2. The method of facilitating the formation of groups of trustworthy members of claim 1, wherein sending the first e-mail message to the e-mail client of an invitee comprises sending a public key of the inviting group member and wherein sending the second e-mail message to the e-mail client of the inviting group member comprises sending a public key of the invitee.

3. The method of facilitating the formation of groups of trustworthy members of claim 1, the method further comprising:
   inserting a welcome command into the header of a third e-mail message originating from the inviting group member;
   sending the third e-mail message to the invitee's e-mail client, wherein the third e-mail comprises a list of current group members;
   detecting the welcome command at the invitee's e-mail client;
   inserting an introduce command into the header of a fourth e-mail message originating from the invitee;
   sending fourth e-mail to the e-mail client of each listed current group member;
   detecting the introduce command at each listed current group member's e-mail client; and
   receiving the list of current group members.

4. A method of replicating data among members of a first group via a network, wherein the first group comprises two or more members, and wherein each group member has a group folder for receiving a data set, the method comprising:
   authoring a change to a data set in an authoring member's group folder to create a changed data set;
   creating a patch data file representing the change applied to the data set;
   inserting a patch command into the header of an e-mail message originating from a device of the authoring member, wherein the e-mail message comprises the patch data file, the device having access to the network;
   sending the e-mail message via the network to the e-mail client of each group member;
   detecting the patch command at each group member's e-mail client; and
   applying the patch data file to the data set in the group folder of each group member so as to replicate the changed data set in the group folder of each group member.

5. The method of replicating data among members of a first group of claim 4,
   wherein the group folder further comprises a current hash value representing a hash of the data set in the group folder,
   wherein the patch data file comprises
      a first hash value representing a hash of the data set before application of the change,
      a second hash value representing a hash of the data set after the application of a change, and
      patch data, and
   wherein applying the patch data file to the data set so as to replicate the changed data set in the group folder of each group member comprises:
      making a first determination that the first hash value matches current hash value;
      if the first hash value matches the current hash value, applying the patch data to the data set so as to replicate the changed data set in the group folder; and
      replacing the current hash value with the second hash value.

6. The method of replicating data among members of a first group of claim 4, the method further comprising:
   associating the patch data file with the authoring group member; and
   storing the patch file data in a data structure.

7. The method of replicating data among members of a first group of claim 6, wherein associating the patch data file with the authoring group member comprises associating the patch file data with the e-mail of the authoring group member.

8. The method of replicating data among members of a first group of claim 4, wherein inserting a patch command into the header of an e-mail message originating from the group member authoring the change comprises:
   detecting a change to the data set within the group folder; and
   if a data set is changed, inserting a patch command into the header of an e-mail message originating from the group member authoring the change, wherein the e-mail message comprises the patch data file.

9. The method of replicating data among members of a first group of claim 4 further comprising:
   forming a second group comprising members different from the first group and having at least one member common to the first group and the second group;
   authorizing the common member to replicate and forward the changed data set to the members of the second group.

10. A method of replicating data among members of a first group via a network, wherein the group comprises two or more members, and wherein each group member has a group folder for receiving a data set, the method comprising:
    authoring a change to a data set in an authoring member's group folder to create a changed data set;
    creating a patch data file representing the change applied to the data set;
    identifying each group member entitled to receive the patch file;
    inserting a patch command into the header of an e-mail message originating from a device of the authoring member, wherein the e-mail message comprises the patch data file, the device having access to the network;
    sending the e-mail message via the network to the e-mail client of each entitled group member;
    detecting the patch command at each entitled group member's e-mail client; and
    applying the patch data file to the data set in the group folder of each entitled group member so as to replicate the changed data set in the group folder of each entitled group member.

11. The method of replicating data among members of a first group of claim 10,
    wherein the group folder further comprises a current hash value representing a hash of the data set in the group folder,
    wherein the patch data file comprises
       a first hash value representing a hash of the data set before application of the change,
       a second hash value representing a hash of the data set after the application of a change, and
       patch data, and
    wherein applying the patch data file to the data set so as to replicate the changed data set in the group folder of each entitled group member comprises:
       making a first determination that the first hash value matches current hash value;

if the first hash value matches the current hash value, applying the patch data to the data set so as to replicate the changed data set in the group folder; and replacing the current hash value with the second hash value.

12. The method of replicating data among members of a first group of claim 10, the method further comprising:

associating the patch data file with the authoring group member; and storing the patch file data in a data structure.

13. The method of replicating data among members of a first group of claim 12, wherein associating the patch data file with the authoring group member comprises associating the patch file data with the e-mail of the authoring group member.

14. The method of replicating data among members of a first group of claim 10, wherein inserting a patch command into the header of an e-mail message originating from the group member authoring the change comprises:

detecting a change to the data set within the group folder; and if a data set is changed, inserting a patch command into the header of an e-mail message originating from the group member authoring the change, wherein the e-mail message comprises the patch data file.

15. The method of replicating data among members of a first group of claim 10 further comprising:

forming a second group comprising members different from the first group and having at least one member common to the first group and the second group;

authorizing the common member to replicate and forward the changed data set to the members of the second group.

16. A method of replicating data among members of a plurality of groups via a network, wherein each group comprises two or more members, wherein each group member has a group folder for receiving one or more data sets, and wherein at least one group member is common to two or more of the plurality of groups, the method comprising:

associating the group folder of the common member with at least two of the groups to which the common member belongs;

receiving via the network a data set in the group folder of the common member from a first group to which the common member belongs; and replicating via the network the received data set in the group folder of each member of each group associated with the group folder of the common member.

17. A data replication system (DRS) comprising:

a DRS message, the DRS message comprising a GROUP element, a VERB element, and an ARGUMENT element;

a group of members, wherein the group is identified by a GROUP element;

a message redirector adapted to:

extract the DRS message from a stream of messages; and direct the DRS message to the command processor; and a command processor executing software instructions to cause the command processor to;

parse the GROUP element to identify a group to which the DRS message is directed;

parse the VERB element to determine an action to be applied to the group; and parse the ARGUMENT element to determine an object to which the action will be applied.

18. The data replication system of claim 17, wherein the DRS message comprises an e-mail message.

19. The data replication system of claim 18, wherein DRS message further comprises a TO element, a FROM element, and an ID element.

20. The data replication system of claim 19, wherein the ID element is a Universal Unique Identifier.

* * * * *